United States Patent
Tezuka

(10) Patent No.: US 11,757,392 B2
(45) Date of Patent: Sep. 12, 2023

(54) CONTROLLER AND PROGRAM

(71) Applicant: FANUC CORPORATION, Yamanashi (JP)

(72) Inventor: Junichi Tezuka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 17/904,372

(22) PCT Filed: Mar. 1, 2021

(86) PCT No.: PCT/JP2021/007730
§ 371 (c)(1),
(2) Date: Aug. 16, 2022

(87) PCT Pub. No.: WO2021/177235
PCT Pub. Date: Sep. 10, 2021

(65) Prior Publication Data
US 2023/0062641 A1 Mar. 2, 2023

(30) Foreign Application Priority Data
Mar. 2, 2020 (JP) ................................ 2020-035263

(51) Int. Cl.
*H02P 23/14* (2006.01)
(52) U.S. Cl.
CPC .......... *H02P 23/14* (2013.01); *H02P 2207/01* (2013.01)
(58) Field of Classification Search
CPC ...... H02P 23/14; H02P 2207/01; H02P 23/20; H02P 29/024; G01M 15/00
USPC ................................ 318/799, 798, 767, 727
See application file for complete search history.

(56) References Cited

U.S. PATENT DOCUMENTS 4,509,126 A * 4/1985 Olig .................. G05B 19/4163
700/173

FOREIGN PATENT DOCUMENTS

JP 2016-200523 A 12/2016
JP 2018-028513 A 2/2018

OTHER PUBLICATIONS

Horiguchi, Mitsutoshi, "Measurement of Mechanical Losses of Small Induction Motors", The Transactions of the Institute of Electrical Engineers of Japan, 2006, vol. 126, No. 10, pp. 1415-1416.

(Continued)

*Primary Examiner* — David Luo
(74) *Attorney, Agent, or Firm* — Studebaker & Brackett PC

(57) ABSTRACT

Provided are a controller and a program with which it is possible to easily output the state of mechanical loss in an induction motor. A controller for controlling industrial machinery that has an induction motor comprises: an electric power cutoff unit that cuts off the supply of electric power to the induction motor; a speed acquisition unit that acquires the speed of the induction motor; an acceleration calculation unit that calculates acceleration on the basis of the acquired speed; a moment-of-inertia acquisition unit that acquires the moment of inertia of a spindle of the induction motor; a mechanical loss calculation unit that calculates mechanical loss in the induction motor on the basis of the acquired speed, the calculated acceleration, and the acquired moment of inertia; and an output unit that outputs the calculated mechanical loss.

4 Claims, 9 Drawing Sheets

(56) References Cited

OTHER PUBLICATIONS

Komine, Takayuki et al., "Research on loss measurement and magnetic field analysis of high efficiency motor", Toyo Denki review, 2019, No. 140, pp. 11-18.
International Search Report issued in PCT/JP2021/007730 ; dated Apr. 27, 2021.

* cited by examiner

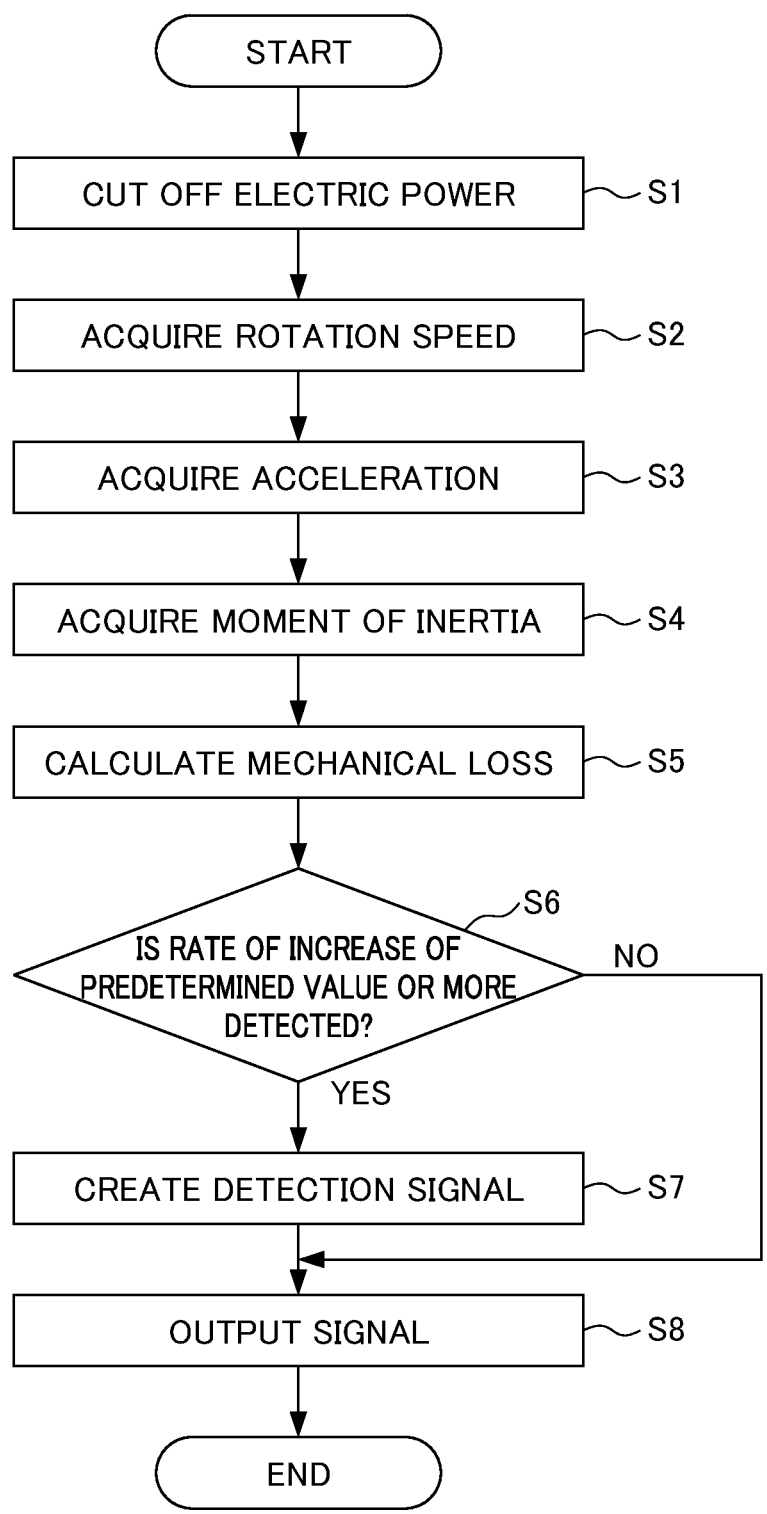

CONTROLLER AND PROGRAM

TECHNICAL FIELD

The present disclosure relates to a controller and a program.

BACKGROUND ART

Conventionally, a machine tool having an induction motor has been known. The induction motor is used for rotation of a spindle due to relatively wide low-output characteristics.

However, due to large mechanical friction of the spindle, the induction motor may generate relatively large heat at a start of no-load. Further, due to the large mechanical friction of the spindle, machining may not be performed according to output specifications of the induction motor. In order to detect such a state, for example, a machine tool has been proposed that inspects a deteriorated state of a motor (for example, see Patent Document 1).

Patent Document 1: Japanese Unexamined Patent Application, Publication No. 2016-200523

DISCLOSURE OF THE INVENTION

Problems to be Solved by the Invention

In the machine tool disclosed in Patent Document 1, a time is measured from when the supply of power to the spindle motor is cut off to a stop of the motor rotating by inertia. In the machine tool disclosed in Patent Document 1, it is determined whether the measured time deviates from a predetermined threshold time interval. Thus, deterioration of the motor can be easily detected. In particular, it is useful that a state of mechanical loss in the induction motor can be easily output.

Means for Solving the Problems (1) The present disclosure provides a controller that controls an induction motor, the controller including: an electric power cutoff unit that cuts off supply of electric power to the induction motor; a speed acquisition unit that acquires a rotation speed of the induction motor; an acceleration calculation unit that calculates acceleration based on the acquired rotation speed; a moment-of-inertia acquisition unit that acquires moment of inertia of a spindle of the induction motor; a mechanical loss calculation unit that calculates mechanical loss in the induction motor on the basis of the acquired rotation speed, the calculated acceleration, and the acquired moment of inertia; and an output unit that outputs the calculated mechanical loss.

(2) In addition, the present disclosure provides a program that causes a computer to function as a controller that controls an induction motor, the program causing the computer to function as: an electric power cutoff unit that cuts off supply of electric power to the induction motor; a speed acquisition unit that acquires a rotation speed of the induction motor; an acceleration calculation unit that calculates acceleration based on the acquired rotation speed; a moment-of-inertia acquisition unit that acquires moment of inertia of a spindle of the induction motor; a mechanical loss calculation unit that calculates mechanical loss in the induction motor based on the acquired rotation speed, the calculated acceleration, and the acquired moment of inertia; and an output unit that outputs the calculated mechanical loss.

Effects of the Invention

According to the present disclosure, it is possible to provide a controller and a program that can easily output a state of mechanical loss in the induction motor.

BRIEF DESCRIPTION OF THE DRAWINGS

FIG. 9 is a flowchart showing a flow of operation of the controller of the embodiment.

PREFERRED MODE FOR CARRYING OUT THE INVENTION

Hereinafter, a controller 1 and a program according to an embodiment of the present disclosure will be described with reference to FIGS. 1 to 9. Before description of the controller 1 and the program of the present embodiment, a constitution of a control system 100 including the controller 1 will be described.

Figure 1:
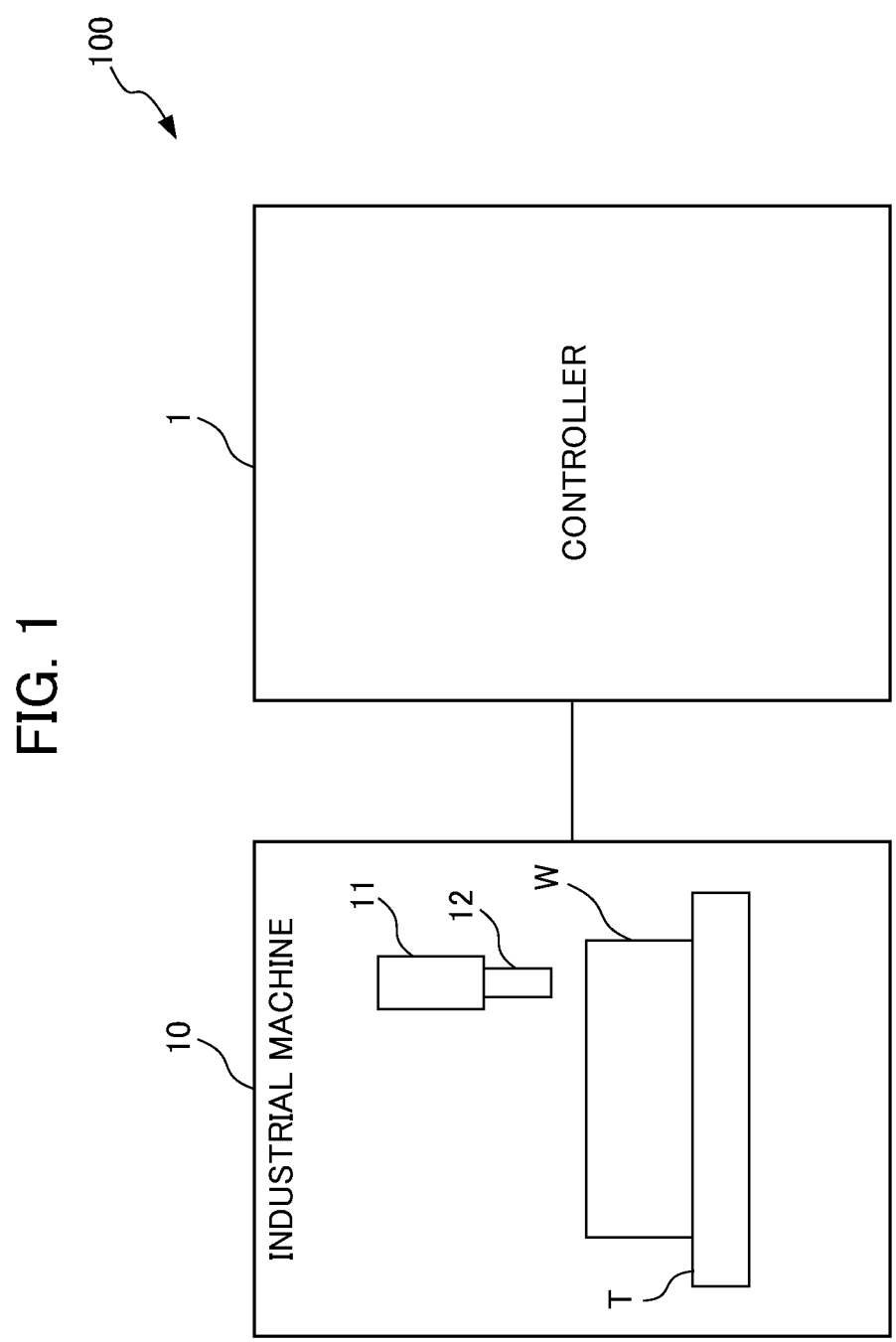
FIG. 1 is a schematic block diagram showing a control system including a controller according to an embodiment of the present disclosure.

The control system 100 includes, for example, an industrial machine 10 and a controller 1 as shown in FIG. 1. The control system 100 is, for example, a system for machining a workpiece W according to a predetermined machining program.

The industrial machine 10 is a machine tool, for example. The industrial machine 10 performs machining on the workpiece W placed on a placing table T. The industrial machine 10 includes an induction motor 11 and a tool 12. The industrial machine 10 refers to a machine including various machines, for example, a machine tool, an industrial robot, a service robot, a forging pressure machine, and an injection molding machine.

The induction motor 11 is, for example, an electric motor that drives a spindle (not shown). The induction motor 11 rotates the spindle around an axial center due to generation of a rotating magnetic field during current carrying. On the other hand, after a power supply cutoff, the induction motor 11 rotates the spindle around the axial center until it stops due to inertia (hereinafter, a rotation after the power supply cutoff is also referred to as "free run").

The tool 12 is, for example, an instrument that actually removes the workpiece W. The tool 12 is arranged on the spindle. The tool 12 is attached to the spindle of the induction motor 11, for example. Then, the tool 12 performs machining on the workpiece W using a torque of the induction motor 11.

The controller 1 is a device that controls the industrial machine 10. The controller 1 is, for example, a device that servo-controls an operation of the induction motor 11. The controller 1 controls the operation (rotation speed) of the induction motor 11 to perform machining on the workpiece W into a desired shape.

Figure 2:
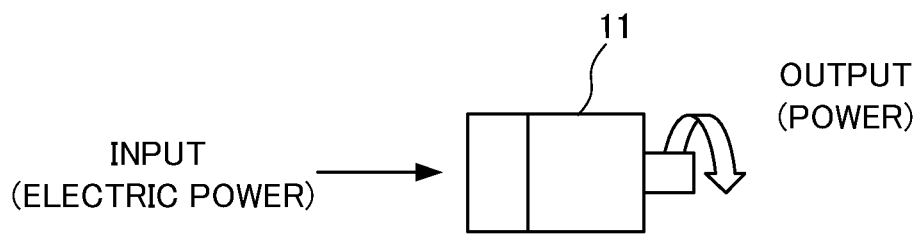
FIG. 2 is a schematic diagram showing a relationship between an input and an output of an induction motor to be controlled by the controller of the embodiment.

Next, a method of calculating a mechanical loss of the induction motor 11 will be described in more detail. The induction motor 11 outputs power in response to an input (supply) of electric power, for example, as shown in FIG. 2. At this time, the loss in the induction motor 11 is obtained by a difference between the input and the output. In other words, it is obtained by (Loss)=(Input)−(Output).

The loss is obtained by the sum of a copper loss, an iron loss, and a mechanical loss. In other words, the loss is obtained by (Loss)=(Copper loss)+(Iron loss)+(Mechanical loss). Here, the copper loss is a loss caused by an electric current. Further, the iron loss is a loss caused by a change in magnetic flux.

The induction motor 11 does not have a permanent magnet. For this reason, in the induction motor 11, both the copper loss and the iron loss become 0 due to the electric power cutoff. In other words, the induction motor 11 satisfies the following conditions: (Loss)=(Mechanical loss) and (Mechanical loss)=−(Output). An average loss P[W] in a certain section in which deceleration and stopping occur only from the mechanical loss due to the power cutoff is expressed using the moment of inertia J [kgm$^2$] of the spindle as follows:

[Formula 1]
$$P = J \times \frac{(N_2 - N_1)\frac{2\pi}{60}}{t_2 - t_1} \times \omega = J \times \frac{(N_2 - N_1)\frac{2\pi}{60}}{t_2 - t_1} \times \left(\frac{N_1 + N_2}{2} \times \frac{2\pi}{60}\right)$$

Here, $N_1$ (1/min) indicates a start speed at a start time $t_1$ (sec) of the above-described certain section. Further, $N_2$ indicates an end speed at an end time $t_2$ (sec) of the above-described certain section. In a case of using an angular acceleration a [rad/s$^2$] at a certain angular speed $\omega$ [rad/s] during deceleration and stopping, a mechanical loss L [W] at the angular speed $\omega$ [rad/s] is obtained by calculation of the following formula.

$$L = J \cdot a \cdot \omega$$

Figure 3:
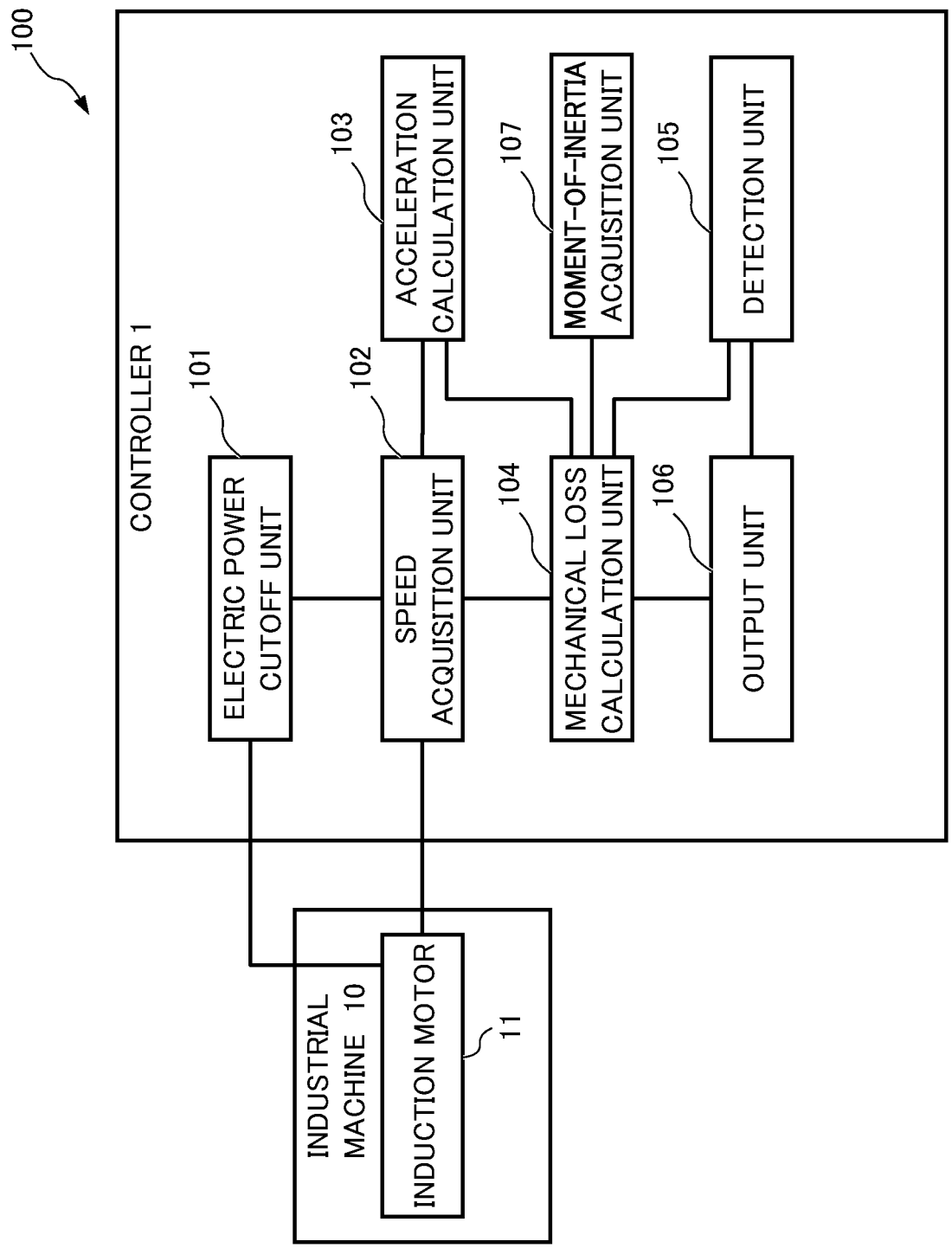
FIG. 3 is a block diagram showing a constitution of the controller of the embodiment.

Next, the controller 1 and the program of the present embodiment will be described. As shown in FIG. 3, the controller 1 according to the present embodiment includes, for example, an electric power cutoff unit 101, a speed acquisition unit 102, an acceleration calculation unit 103, a moment-of-inertia acquisition unit 107, a mechanical loss calculation unit 104, a detection unit 105, and an output unit 106.

The electric power cutoff unit 101 is realized as a CPU operates, for example. The electric power cutoff unit 101 cuts off supply of electric power to the induction motor 11. The electric power cutoff unit 101 cuts off the supply of electric power to the induction motor 11 from a power supply unit (not shown) at predetermined timing, for example. Specifically, the electric power cutoff unit 101 sends a command to the industrial machine 10 to cut off the supply of electric power to the induction motor 11, and thus causes the industrial machine 10 to cut off the supply of electric power to the induction motor 11.

Figure 4:
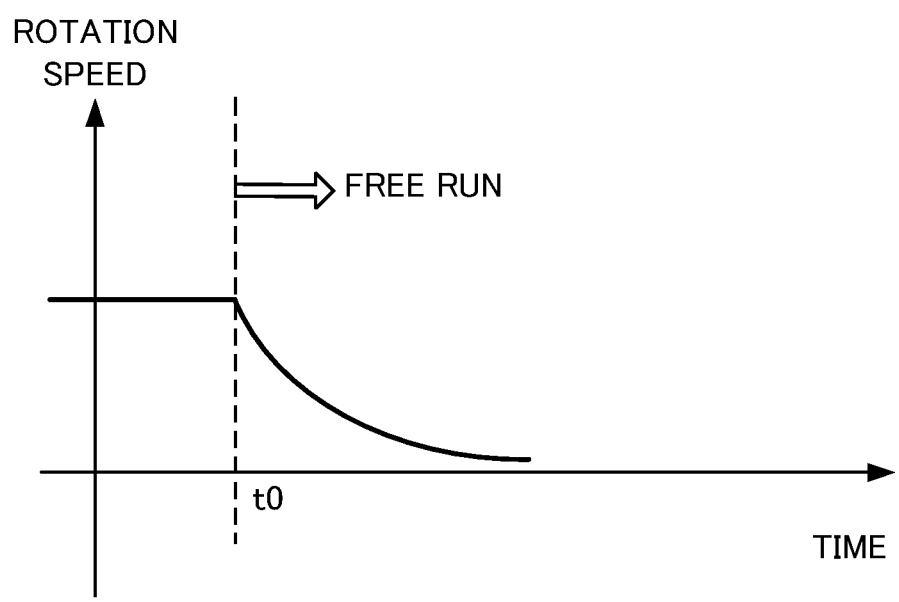
FIG. 4 is a graph showing a relationship between a rotation speed of the induction motor acquired by a speed acquisition unit of the controller of the embodiment and a time.

The speed acquisition unit 102 is realized as a CPU operates, for example. The speed acquisition unit 102 acquires a rotation speed of the induction motor 11. The speed acquisition unit 102 acquires an output signal indicating an angular speed from a sensor (not shown) provided in the induction motor 11, for example, and thus acquires a rotation speed of the induction motor 11. The speed acquisition unit 102 acquires a rotation speed of the induction motor 11 when electric power is cut off at time t0, as shown in FIG. 4, for example.

Figure 5:
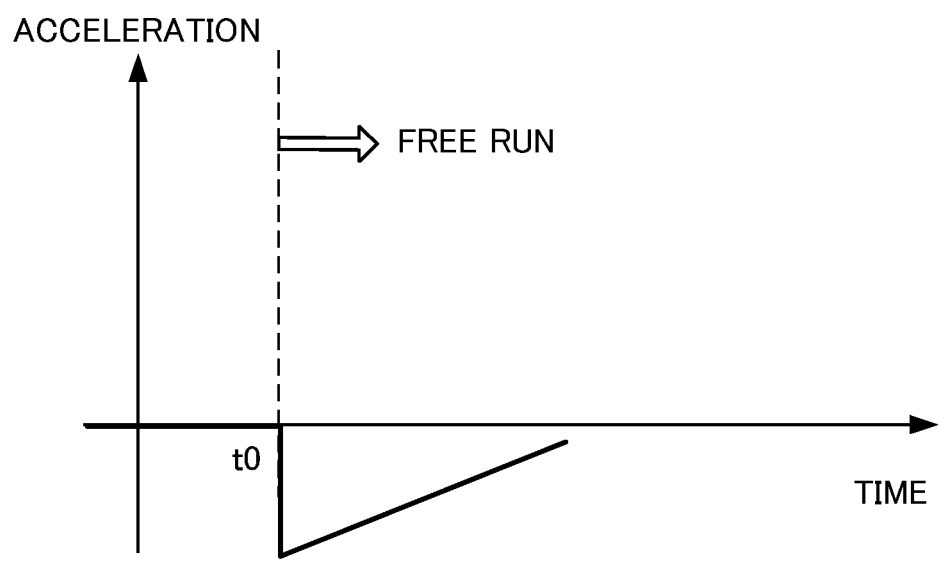
FIG. 5 is a graph showing a relationship between acceleration of the induction motor calculated by an acceleration calculation unit of the controller of the embodiment and a time.

The acceleration calculation unit 103 is realized as a CPU operates, for example. The acceleration calculation unit 103 calculates acceleration based on the acquired rotation speed. The acceleration calculation unit 103 calculates acceleration by differentiating the acquired rotation speed, for example. The acceleration calculation unit 103 acquires acceleration due to the mechanical loss of the induction motor 11 when electric power is cut off at time t0, as shown in FIG. 5, for example.

The moment-of-inertia acquisition unit 107 is realized as a CPU operates, for example. The moment-of-inertia acquisition unit 107 acquires moment of inertia of the spindle of the induction motor 11 from outside.

Figure 6:
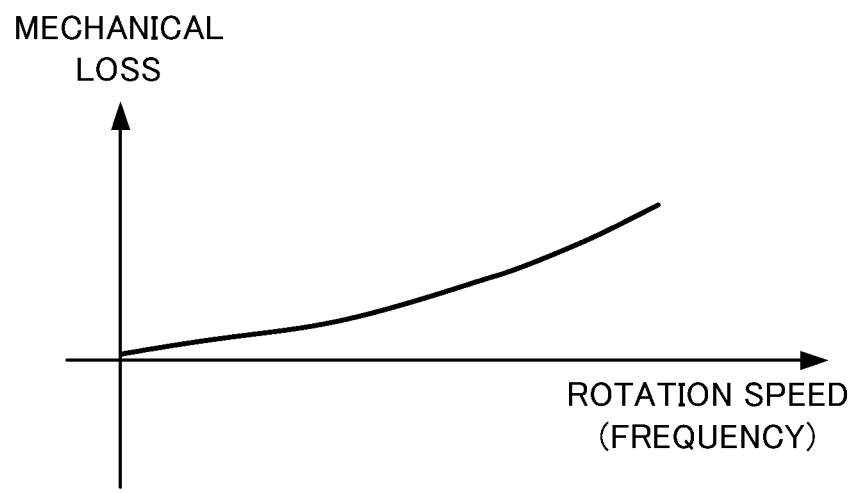
FIG. 6 is a graph showing an example of a relationship between a rotation speed output by an output unit of the controller of the embodiment and mechanical loss.

The mechanical loss calculation unit 104 is realized as a CPU operates, for example. The mechanical loss calculation unit 104 calculates a mechanical loss of the induction motor 11 on the basis of the acquired rotation speed, the calculated acceleration, and the acquired moment of inertia. The mechanical loss calculation unit 104 calculates a relationship between the mechanical loss and the rotation speed (frequency), as shown in FIG. 6, for example.

Figure 7:
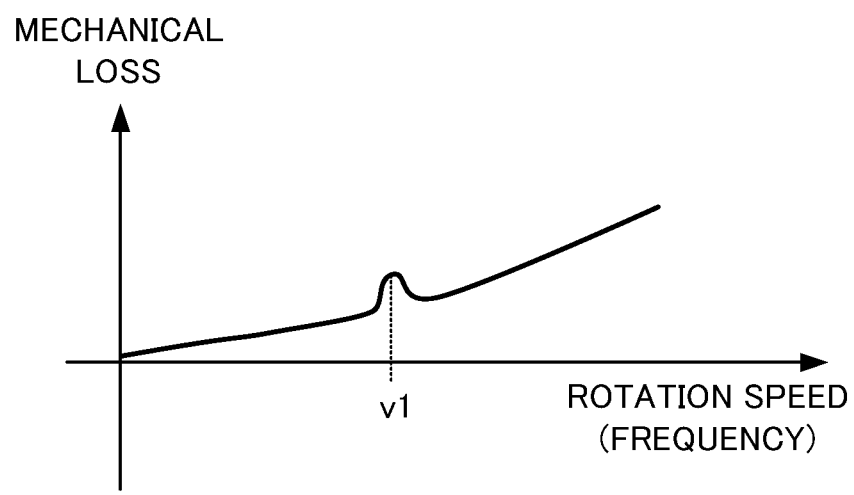
FIG. 7 is a graph showing an example of a relationship between a rotation speed output by the output unit of the controller of the embodiment and mechanical loss.

When it is considered that a sudden event has occurred in which a friction or the like of the induction motor 11 changes, the mechanical loss calculation unit 104 calculates a relationship between a mechanical loss and a rotation speed (frequency) as shown in FIG. 7. In this example, the mechanical loss calculation unit 104 calculates a rate of change in mechanical loss at a rotation speed v1, which is higher than that at other rotation speeds. In other words, the mechanical loss calculation unit 104 calculates a relatively higher rate of increase in mechanical loss at the rotation speed v1 than a rate of increase in mechanical loss with respect to the increase of the rotation speed.

Figure 8:
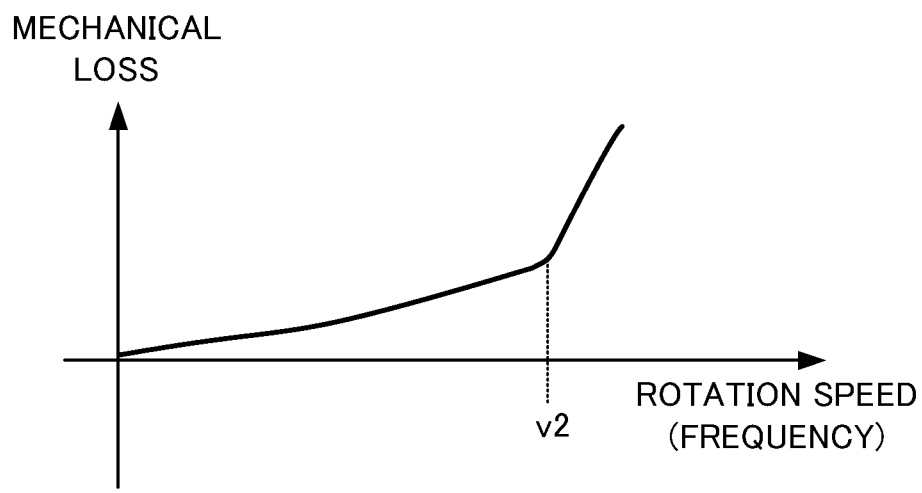
FIG. 8 is a graph showing an example of a relationship between a rotation speed output by the output unit of the controller of the embodiment and mechanical loss.

Further, when lubrication of a bearing (not shown) of the induction motor 11 is not in an appropriate state, the mechanical loss calculation unit 104 calculates a relationship between a mechanical loss and a rotation speed (frequency) as shown in FIG. 8. In this example, the mechanical loss calculation unit 104 calculates a rate of change in mechanical loss at a rotation speed v2, which is higher than that at other rotation speeds. In other words, the mechanical loss calculation unit 104 calculates a relatively higher rate of increase in mechanical loss at the rotation speed v2 than a rate of increase in mechanical loss with respect to the increase of the rotation speed.

The detection unit 105 is realized as a CPU operates, for example. The detection unit 105 detects a change in the calculated mechanical loss in which the rate of increase in the mechanical loss with respect to the increase in speed becomes larger than a predetermined value. Further, the detection unit 105 detects the rotation speed at which the rate of increase becomes larger than a predetermined value. In the example of FIG. 6, for example, the detection unit 105 does not detect a change in the rate of increase larger than the predetermined value. In the example of FIG. 7, for example, the detection unit 105 detects the increase in mechanical loss at the rotation speed v1 as a change in the rate of increase larger than the predetermined value. In the example of FIG. 8, for example, the detection unit 105 detects the increase in mechanical loss at the rotation speed v2 as a change in the rate of increase larger than the predetermined value.

The output unit 106 is realized as a CPU operates, for example. The output unit 106 outputs the calculated mechanical loss. The output unit 106 outputs, for example, a signal for displaying the relationship between the rotation speed (frequency) and the mechanical loss calculated by the mechanical loss calculation unit 104 on a display device (not shown) such as a display. Further, the output unit 106 outputs a signal indicating that the change larger than the predetermined value is detected. The output unit 106 outputs, as a signal such as a display or a voice, the signal indicating that the change larger than the predetermined value is detected, for example. In addition, the output unit 106 outputs a signal indicating the detected rotation speed. The output unit 106 outputs, for example, a signal indicating the detected rotation speed v1. Further, the output unit 106 outputs, for example, a signal indicating the detected rotation speed v2.

Next, the operation of the controller 1 will be described. First, the electric power cutoff unit 101 cuts off the supply of electric power to the induction motor 11 (Step S1). Next, the speed acquisition unit 102 acquires a rotation speed of the induction motor 11 over time (Step S2). Next, the acceleration calculation unit 103 calculates the acceleration based on the acquired rotation speed (Step S3). Further, the moment-of-inertia acquisition unit 107 acquires the moment of inertia of the spindle of the induction motor 11 (Step S4). Next, the mechanical loss calculation unit 104 calculates the mechanical loss on the basis of the acquired rotation speed, the calculated acceleration, and the acquired moment of inertia (Step S5).

Next, the detection unit 105 detects a rotation speed having a rate of increase of a predetermined value or more in the relationship between the increase in the rotation speed and the mechanical loss (Step S6). When the rate of increase of the predetermined value or more is detected (Step S6: YES), the process proceeds to Step S7. On the other hand, when the rate of increase of the predetermined value or more is not detected (Step S6: NO), the detection unit 105 does not output a signal. Then, the process proceeds to Step S8.

In Step S7, the detection unit 105 sends a signal indicating that the detection has been made, to the output unit 106. Further, the detection unit 105 sends a signal indicating the detected rotation speed to the output unit 106. Then, the process proceeds to Step S8.

In Step S8, the output unit 106 outputs the calculated mechanical loss. Further, upon receiving the signal from the detection unit 105, the output unit 106 outputs the signal indicating that the rate of increase of the predetermined value or more is detected and the signal indicating the detected rotation speed.

Next, the program will be described. Each of the components included in the controller 1 can be implemented by hardware, software, or a combination thereof. Here, the implementation by the software means that a computer executes the software by reading a program.

The program can be stored and provided to a computer using various types of non-transitory computer readable media. Non-transitory computer readable media include various types of tangible storage media. Examples of non-transitory computer readable media include magnetic storage media (such as flexible disks, magnetic tapes, hard disk drives, etc.), optical magnetic storage media (e.g., magneto-optical disks), CD-ROM (CD-ROM Read Only Memory), CD-R, CD-R/W, and semiconductor memories (such as mask ROM, PROM (Programmable ROM), EPROM (Erasable PROM), flash ROM, RAM (Random Access Memory), etc.). The display program may be provided to a computer using various types of transitory computer readable media. Examples of transitory computer readable media include electric signals, optical signals, and electromagnetic waves. Transitory computer readable media can provide the program to a computer via a wired communication channel (e.g., electric wires, and optical fibers) or a wireless communication channel.

The controller 1 and the program according to the present embodiment described above have the following effects.

(1) A controller 1 that controls an industrial machine 10 having an induction motor 11, the controller 1 including: an electric power cutoff unit 101 that cuts off supply of electric power to the induction motor 11; a speed acquisition unit 102 that acquires a rotation speed of the induction motor 11; an acceleration calculation unit 103 that calculates acceleration based on the acquired rotation speed; a moment-of-inertia acquisition unit 107 that acquires moment of inertia of a spindle of the induction motor 11; a mechanical loss calculation unit 104 that calculates mechanical loss in the induction motor 11 on the basis of the acquired rotation speed, the calculated acceleration, and the acquired moment of inertia; and an output unit 106 that outputs the calculated mechanical loss. Thus, it is possible to easily output a state of mechanical loss in the induction motor 11. Therefore, it is possible to easily determine whether there is a mechanical abnormality in the spindle M when vibration or heat generation of the induction motor 11 during no-load operation is large. Further, when there is an abnormality in the spindle M, it is possible to easily find out and analyze causes.

(2) The controller 1 further includes a detection unit 105 that detects a change in the calculated mechanical loss in which a rate of increase in mechanical loss with respect to an increase in rotation speed becomes larger than a predetermined value, and the output unit 106 outputs a signal indicating that the change larger than the predetermined value is detected. Thus, it is possible to output the abnormality of the mechanical loss in the induction motor 11 together with the calculated mechanical loss.

(3) The detection unit 105 detects a rotation speed at which the rate of increase in mechanical loss becomes larger than the predetermined value, and the output unit 106 outputs a signal indicating the detected rotation speed. Thus, it is also possible to output details of the abnormality. Accordingly, it is possible to provide predictable information regarding the types of defects to be assumed.

Although preferred embodiment of the controller and the program of the present disclosure has been described above, the present disclosure is not limited to the above-described embodiments and can be appropriately changed. For example, in the above embodiment, the speed acquisition unit 102 operates after the supply of electric power is cut off, but is not limited thereto. The speed acquisition unit 102 may acquire the rotation speed of the induction motor 11 at all times.

In the above embodiment, a factor output unit (not shown) may be further provided that outputs a factor of abnormality to be assumed based on the rate of increase in mechanical loss. In the case shown in FIG. 7, for example, the factor output unit may transmit a signal to the output unit 106 indicating that a sudden event such as change in friction is considered to have occurred. In the case shown in FIG. 8, for example, the factor output unit may transmit a signal to the output unit 106 indicating that lubrication of the bearing is not in an appropriate state and the loss is increasing in a high speed range. The output unit 106 may output the signal acquired from the factor output unit.

In the above embodiment, the detection unit 105 may detect, as a zone, the rotation speed at which the rate of increase in mechanical loss becomes larger than a predetermined value. The output unit 106 may output a signal indicating the zone of the detected rotation speed.

EXPLANATION OF REFERENCE NUMERALS 1 controller
10 industrial machine
11 induction motor
12 tool
101 electric power cutoff unit
102 speed acquisition unit
103 acceleration calculation unit
104 mechanical loss calculation unit
105 detection unit
106 output unit
107 moment-of-inertia acquisition unit

The invention claimed is:

1. A controller that controls an induction motor, the controller comprising:
an electric power cutoff unit that cuts off supply of electric power to the induction motor;
a speed acquisition unit that acquires a rotation speed of the induction motor;
an acceleration calculation unit that calculates acceleration based on the acquired rotation speed;
a moment-of-inertia acquisition unit that acquires moment of inertia of a spindle of the induction motor;
a mechanical loss calculation unit that calculates mechanical loss in the induction motor on the basis of the acquired rotation speed, the calculated acceleration, and the acquired moment of inertia; and
an output unit that outputs the calculated mechanical loss.

2. The controller according to claim 1, further comprising a detection unit that detects a change in the calculated mechanical loss in which a rate of increase in mechanical loss with respect to an increase in rotation speed becomes larger than a predetermined value, wherein
the output unit outputs a signal indicating that the change larger than the predetermined value is detected.

3. The controller according to claim 2, wherein the detection unit detects a rotation speed at which the rate of increase in mechanical loss becomes larger than the predetermined value, and
the output unit outputs a signal indicating the detected rotation speed.

4. A recording medium which non-transitorily records a program that causes a computer to function as a controller that controls an induction motor,
the program causing the computer to function as:
an electric power cutoff unit that cuts off supply of electric power to the induction motor;
a speed acquisition unit that acquires a rotation speed of the induction motor;
an acceleration calculation unit that calculates acceleration based on the acquired rotation speed;
a moment-of-inertia acquisition unit that acquires moment of inertia of a spindle of the induction motor;
a mechanical loss calculation unit that calculates mechanical loss in the induction motor on the basis of the acquired rotation speed, the calculated acceleration, and the acquired moment of inertia; and
an output unit that outputs the calculated mechanical loss.

* * * * *